3,650,961
PROCESS FOR PREPARING PARTICULATE PRODUCTS HAVING PREFERENTIALLY INTERNALLY CONCENTRATED CORE COMPONENTS
Robert B. Hudson, St. Louis, Mo., assignor to Monsanto Company, St. Louis, Mo.
Filed July 18, 1969, Ser. No. 842,890
Int. Cl. B44d 1/095; C11d 7/42, 7/56
U.S. Cl. 252—99
6 Claims

ABSTRACT OF THE DISCLOSURE

Granular particles comprising a partially hydrated inorganic salt and a core component, the core component being preferentially internally concentrated in the particles, are prepared by spraying an aqueous medium containing the core component onto a fluidized bed of hydrateable inorganic salt. Such particles wherein the core component is, for example, a chlorocyanurate are useful ingredients of detergent compositions wherein they exhibit excellent chemical and physical stability.

BACKGROUND OF THE INVENTION

This invention relates to a novel, fluidized bed process for making granular compositions composed of particles ocmprising a core component preferentially internally concentrated or substantially encapsulated within a matrix or coating of partially hydrated inorganic salt. The invention further relates to novel compositions of the aforesaid type wherein the partially hydrated inorganic salt comprises a major proportion of phosphate salts, at least 90% by weight of the phosphate salts being sodium tripolyphoshate.

It is well-known that the practical utility of numerous materials is limited by physical or chemical incompatibility with ingredients of formulations in which they would otherwise be desirably employed, or, with atmospheric moisture under normal storage conditions. Problems of this type are encountered, for example, with many chlorocyanurate compounds. Commercially available chlorocyanurates are generally in the form of very fine particles which, when mixed with various carrier agents, tend to segregate or stratify therefrom. Such stratification is undesirable since it renders the packaged composition non-homogeneous and uniform results are not obtained as successive portions of the package are utilized. Thus, the chlorocyanurate is considered "physically incompatible" in such mixtures. In addition, the chlorocyanurates tend to decompose in contact with atmospheric moisture thereby loosing chlorine available for bleaching and producing an undesirable chlorine odor. The chlorocyanurates also tend to be reactive with certain conventional detergent ingredients, for example, nonionic surfactants, and cannot be readily combined with such ingredients to provide stable, all-purpose bleaching-cleaning formulations. Those skilled in the art, will, of course, recognize numerous problems of this type inherent in a variety of materials used not only in detergent and bleaching formulations but in numerous other applications.

It is further recognized by those skilled in the art that problems of the type discussed above associated with various materials can be eliminated or greatly reduced by providing the physically or chemically incompatible material with a protective coating. Coating or encapsulation of particulate materials can be conveniently accomplished by fluidized bed techniques. In techniques of this type, the particulate material to be coated is formed into a fluidized bed in accordance with well-understood engineering principles (see, for example, "Fluidization" by Max Leva, McGraw-Hill, 1956) and a slurry or solution of the coating material is sprayed onto the fluidized particles. The particles, coated with the solution or slurry, are then subjected to a drying operation to remove free water or other solvent and, in some instances, water of hydration. Processes of this type as applied to coating of chlorocyanurates are described, for example, in U.S. Pat. No 3,112,274.

Although such processes are effective to coat a variety of materials, the necessity of providing a drying step to remove water associated with the coating material is undesirable. Obviously, such drying steps are expensive and time consuming. More importantly, the temperature required for drying, particularly if removal of water of hydration is required, often results in degradation of the coating or of the encapsulated material. For example, dehydration of sodium tripolyphosphate hexahydrate results in extensive hydrolytic degradation to ortho and pyrophosphates.

SUMMARY OF THE INVENTION

It is an object of this invention to provide novel fluidized bed processes for making compositions composed of particles comprising a core component preferentially internally concentrated within a partially hydrated inorganic salt matrix or coating. A further object is to provide such processes wherein the partially hydrated form of the salt is obtained without necessity of a separate drying step. Still another object is to provide a composition of the type referred to above wherein the partially hydrated inorganic salt comprises a major proportion of phosphate salts at least 90% by weight of such salts being sodium tripolyphosphate.

These objects are achieved by introducing droplets of an aqueous slurry of core component material into a fluidized bed of hydrateable, particulate, inorganic salt. The size of the slurry droplets and salt particles and the fluidization conditions are controlled as hereinafter described.

The invention will be more clearly understood from the drawings and the following description of the preferred embodiments.

DESCRIPTION OF THE PREFERRED EMBODIMENTS

The basic operational principles of the process of this invention will be understood by reference to the drawings.

Figure 1:
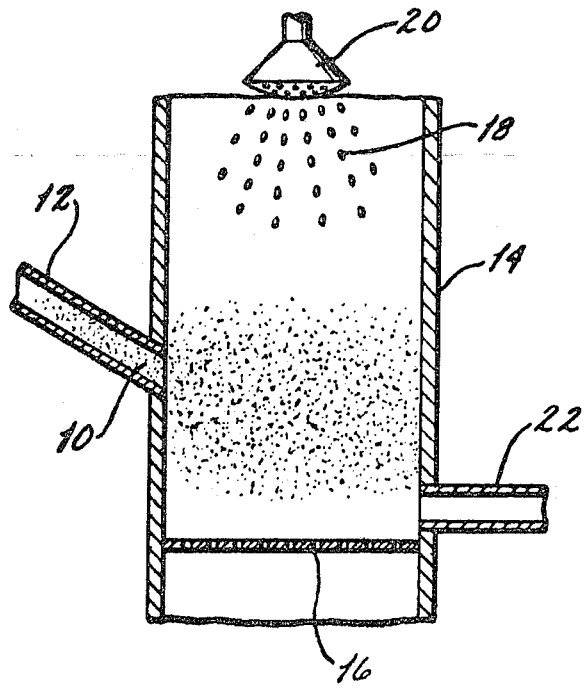
FIG. 1 is a sectional view of apparatus suitable for practicing this invention and illustrating the flow of materials therein.

Referring to FIG. 1, particulate, hydrateable inorganic salt 10, is introduced through inlet tube 12 into a chamber defined by walls 14. The particulate salt is fluidized by a flow of inert gas through porous plate 16. Droplets 18, of an aqueous slurry of core component material are sprayed onto the fluidized bed of inorganic salt from spray head 20. The fluidized salt coats the droplets, absorbing water therefrom and forming a particle wherein the core component is preferentially concentrated internally in the particle comprising the core component and partially hydrated inorganic salt. Referring again to FIG. 2, the particles formed being of greater mass than the hydrateable inorganic salt, fall in the fluidized bed and are removed through exit tube 22.

The process can also be performed in batch type apparatus. That is, although continuous introduction of ingredients into the fluidized bed and simultaneous removal of products are generally desirable, such continuous operation is not essential to the practice of this invention.

Figure 2:
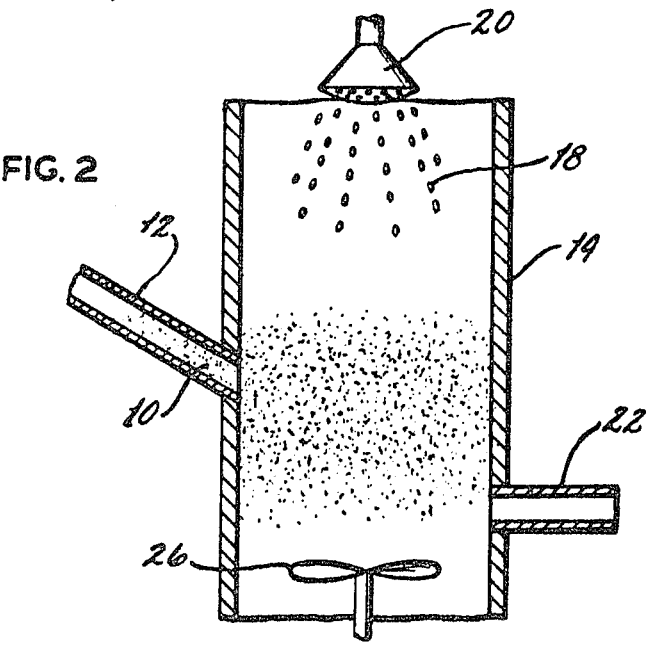
FIG. 2 is a sectional illustration of another embodiment of apparatus suitable for use in the practice of this invention.

If desired, fluidization of the inorganic salt can be accomplished by mechanical rather than pneumatic means. For example, as shown in FIG. 2, a bed of inorganic salt 10 can be fluidized by rapid rotation of impeller blade 26. However, since mechanical fluidization may result in some degree of comminution of product particles, pneumatic fluidization with an inert gas is generally preferred. The term "inert gas" is used in a broad sence to include any gas which is substantially non-reactive with the inorganic salt particles and the core component material. Thus, air as well as helium, argon, nitrogen, and the like generally constitutes an acceptable fluidizing gas.

It is recognized by those skilled in the art that when an aqueous medium is sprayed onto a bed of fluidized particles that the particles within the bed are normally coated with the aqueous medium. Therefore, it is extremely surprising that a process of the type described results in materials introduced in aqueous medium being coated by or preferentially internally concentrated within a matrix of the fluidized particles. To obtain this unique result, control of chemical and physical characteristics of the particles constituting the fluidized bed, the degree of fluidization of such particles, and the manner of introducing the core component material is required.

The particles used to form the fluidized bed must, of course, be chemically compatible with the core component material so as to avoid formation of substantial quantities of undesired reaction products. It will be understood that complete inertness is not required and some reactivity may be desirable if the reaction product thus obtained is not detrimental. The selection of materials based on chemical reactivity or inertness will be readily apparent from general principles governing chemical reactivity or from routine tests.

The material used to form the fluidized bed of this invention must be a readily hydrateable inorganic salt. That is, the inorganic salt must be capable of taking up the water from the droplets as water of hydration. Otherwise, a separate drying step is required. Generally, the use of substantially anhydrous salt is preferred although partially hydrated salt may be employed if desired. The term "partially hydrated salt" refers to lower hydrates of salts capable of forming higher hydrates, or mixtures of anhydrous and fully hydrated particles. Examples of salts suitable for use as an encapsulating material include: $Na_5P_3O_{10}$; $Na_4P_2O_7$; $Na_2SO_4$; $Na_2B_4O_7$; $CuSO_4$; $Na_3PO_4$; $Na_2CO_3$; $Na_2HPO_4$; partial hydrates thereof, and mixtures thereof. The polyphosphate salts, especially sodium tripolyphosphate are particularly preferred when the product is to be used in detergent, water-softening, or bleaching compositions since such salts are known to be functional components in such compositions.

The hydrateable inorganic salts used in the fluidized bed must consist of particles, a major proportion of which have a size of from 5 to 200 microns, preferably from 10 to 150 microns, a size of 10 to 50 microns being particularly preferred. Particle size is determined by gravimetric sedimentation type analysis. Smaller sized particles are swept from the bed under normal fluidization conditions and larger fluid bed particles do not form product particles wherein the core component is preferentially internally concentrated. Relative uniformity of fluid bed particle size is desirable but not essential.

Any slurry forming material meeting the chemical compatibility requirements discussed above can be utilized as the core component. For example, enzymes such as produced by Bacillus, Aspergillus, or Streptomyces micro-organisms including *B. subtilis* strains NRRL B-3411 and NRRL B-3411 (U.S. Department of Agriculture Collection) and IAM 1523 (Japanese Culture Collection) all of which produce mixtures of proteases and amylases, and *B. lichenformis* which produces a predominantly alkaline protease; and chlorocyanurates, such as sodium and potassium salts of di- and tri-chloro cyanuric acid, [(monotrichloro,) tetra-(mono-potassium dichloro,)] pentaisocyanurate, and (trichloro,) (monopotassium dichloro,) di-isocyanurate can be effectively internally concentrated within a matrix of or coated with partially hydrated polyphosphates to form stable detergent ingredients.

The core component material is dispersed as a slurry in water and droplets of the slurry are introduced into the fluidized bed. If the core component is a highly water soluble material, for example, certain well-known enzymes, the slurry is formed by "salting out" the core component, for example, by adding isopropanol or more preferably, an alkali metal salt such as sodium or calcium sulfate. The degree of preferential concentration of the core component in the interior of the particles of this invention is related to the solubility and concentration of the core component in the slurry. The degree of preferential concentration may be such that the product particle comprises a center of core component encapsulated within partially hydrated salt, or core component may be distributed through a salt matrix in gradually decreasing concentration from center to periphery of the particles. Addition of a slurry of relatively insoluble core component to the bed results in a product particle wherein the core component is essentially encapsulated within an inorganic salt shell relatively free of core component material. Such preferential internal concentration of this core component decreases as the core component becomes more soluble.

The quantity of slurry introduced into the fluidized bed is controlled so that the water present therein is less than that stoichiometrically required for total hydration of the hydrateable inorganic salt, and is generally from 20 to 70% by weight of the stoichiometric quantity. Thus, in the product particle, the salt is only partially hydrated. The incompletely hydrated salt is capable of protecting the core component by taking up additional water from the atmosphere. Attempts to obtain complete hydration is not only undesirable from a standpoint of optimum stability, but also usually causes caking in the fluid bed and agglomeration of discrete composite particles which have already formed.

The mean diameter of droplets of the slurry of core component material must be from about 10 to 30 times larger than the mean particle size of the particles comprising the fluidized bed to provide preferential internal concentrations of the core component in product particles. The droplet size is readily controlled by proper choice of spray head, nozzle, or other means for introducing the droplets into the fluidized bed.

In the practice of this invention, the fluidization of the bed of hydrateable inorganic salt should be such that the fluidized salt occupies a volume of at least 1.2 times greater than an identical quantity of unfluidized salt. That is to say, a quantity of hydrateable inorganic salt having a static volume of 100 cubic centimeters will, when properly fluidized in accordance with this invention, occupy a volume of at least 120 cubic centimeters. A fluidization volume of about 1.4 to 2.0 times the static volume is preferred. For many applications, it is desirable to use a so-called "spouted" bed in which there is a distributed flow of gas sufficient to cause fluidization and one or more localized heavier flows of gas which cause the bed to "spout" upward and to circulate rapidly. The "spouts" may be in the form of single jets or in the form of a ring of jets near the wall of the containing vessel. Such "spouts" of rapidly rising gas and material have sufficient velocity to throw the bed material well above the upper bed level established by the distributed gas flow. A "spouted" bed is particularly useful in conjunction with core components materials that retard the hydration of the hydrateable salt.

In pneumatically fluidized beds, particularly spouted beds wherein measurement of bed volume is difficult, the proper degree of fluidization can be more conveniently express as a fluidizing gas flow rate from 10 to 100% in excess of the minimum theoretically required to sustain a fluid bed, as measured by pressure drop through the bed.

It is possible to practice this invention by spraying the core component material into a flow of hydrateable salt particles entrained by the gas stream although this is not usually preferred because of the greater gas requirements and dust collection requirements of such a system.

The degree of fluidization can be readily controlled by varying the velocity of the fluidizing gas or the intensity of mechanical agitation.

In the process of this invention, the composition and size of the product particles and ratio of core component material to partially hydrated salt in the particles can be readily controlled by varying the concentration of core component material contained in the slurry introducted, or varying the droplet size. For example, when introducing a slurry of a chlorinated isocyanurate salt containing 66% available chlorine into a sodium tripolyphosphate bed, one can readily control the available chlorine content of the composite product particle by varying the concentration of chlorinated isocyanurate in the feed slurry. Such feed slurry containing 60% solids by weight will yield a final product assaying 16% chlorine while a feed slurry containing 33% solids yields a final product at 6.5% available chlorine under comparable conditions.

The particle size of the composite product is closely related to the particle size of the droplets of feed slurry impinging on the fluid bed, thus, a choice of nozzle characteristics and slurry pressure permits control of the average particle size derived.

By controlling slurry droplet size and bed particle size as described above, a major portion of product particles desirably sized to pass a 10 mesh and be retained on a 100 mesh U.S. Standard sieve are obtained.

It is seen that the process of this invention does not require a separate drying step. This permits formation of products which are unique in terms of purity since thermal dehydration of inorganic salts such as sodium tripolyphosphate inherently results in degradation of a substantial proportion of such salt to the pyrophosphate and orthophosphate forms may result in thermal degradation of the core component material.

Particularly desirable products obtainable by the practice of this invention are compositions composed of particles comprising a core component internally concentrated within a coating or matrix which comprises a major portion of partially hydrated phosphate salts at leas 90% by dry weight of such salt being sodium tripolyphosphate. Such particles, wherein the core component is sodium hypochlorite, a chlorocyanurate, an enzyme or other detergent ingredient are particularly advantageous for use in cleaning and bleaching compositions. If desired, various other materials can be incorporated with the hydrateable inorganic salt in the fluidized bed. For example, a dye can be incorporated to provide a colored particle which may possess certain esthetic appeal in a detergent formulation. Since the dye is, by the practice of this process, peripherally concentrated, particles of high color intensity are obtained with dye concentrations sufficiently low that fabric discoloration problems are avoided.

The practice of this invention will be further understood from the following examples.

EXAMPLE I 14,000 grams of particulate anhydrous phosphate salt assaying 93% by weight sodium tripolyphosphate and having a mean particle size of 25 microns are admixed with 14 grams finely dvided (<1 micron) silica flow condition and are introduced into a fluidization apparatus having a diameter of 14 inches and fitted with a porous polyethylene grid at the bottom portion. The salt is vigorously fluidizebd to about 1.4 times static volume by passing air through the grid at about 60 cubic feet per minute.

An aqueous slurry containing 60% by weight sodium trichlorocyanurate (assaying 67% available chlorine on a dry basis) is sprayed onto the bed through a nozzle designed to provide a mean droplet diameter of about 500 microns. 6820 grams of the slurry are introduced into the bed in about 1.25 minutes. Bed temperature during the process increases from 30 to 42° C.

A quantity of granular particles (smaller than 12 mesh, larger than 70 mesh—U.S. Standard sieve sizes) equivalent to 58% by eight of feed materials to the bed is obtained.

Microscopic examination of particles broken and dampened with potassium iodide solution to reveal the distribution of the chlorocyanurate, shows the chlorocyanurate to be disposed predominantly at the center of the particle. The composite particle contains about 65% phosphate salt.

Analysis shows the phosphate salt in the particles to be 93% sodium tripolyphosphate demonstrating that no degradation takes place. The salt is 67% by weight hydrated—that is, the salt contains 67% as much water as would be present in sodium tripolyphosphate hexahydrate.

Based on a comparison of chlorine loss, the particulate product is found to be approximately 5 times as stable as a mere mixture comprising the same initial concentrations of sodium tripolyphosphate and sodium trichlorocyanurate powder.

EXAMPLE II

For purposes of comparison, the procedure of Example I is repeated with the exception that a spray nozzle designed to provide slurry droplets not substantially larger than the salt particles in the fluidized bed is utilized.

In the product particles the chlorocyanurate is found to be randomly distributed rather than preferentally concentrated. The particles are significantly less stable with regard to chlorine loss than those produced by the procedure of Example I.

EXAMPLE III

For purposes of comparison, the procedure of Example I is repeated utilizing sodium tripolyphosphate having a particle size of about 400 microns. In the product particles, chlorocyanurate is randomly distributed and stability is significantly less than that of product particles produced in Example I.

Example I above illustrates the practice of this invention. Example II and III illustrating processes outside the scope of the invention demonstrate the criticality of the conditions specified for the practice of this invention.

Although this invention has been described by reference to specific embodiments, various other embodiments within the scope of the appended claims will be apparent to those skilled in the art.

What is claimed is:

1. A method of making a composition composed of particles comprising a core component material selected from the group consisting of enzymes and chlorocyanurates and a partially hydrated inorganic salt selected from the group consisting of $Na_5P_3O_{10}$, $Na_4P_2O_7$, $Na_2SO_4$, $Na_2B_4O_7$, $CuSO_4$, $Na_3PO_4$, $Na_2CO_3$, $Na_2HPO_4$ and partial hydrates thereof, said core component material being preferentially internally concentrated in said particle, said method comprising the steps of;

(a) forming a fluidized bed of particulate, hydrateable inorganic salt composed of a major proportion of particles from 5 microns to 200 microns in size, (b) introducing droplets of an aqueous slurry of said core component material into said fluidized bed, said droplets having a mean diameter from 10 to 30 times larger than the mean particle size of said hydrateable inorganic salt, the amount of water introduced into the fluidized bed being less than stoichiometrically required for hydration of said inorganic salt to the highest hydrate thereof.

2. The method of claim 1 herein said fluidized bed is pneumatically fluidized by a gas flow rate from 10% to 100% in excess of the minimum flow rate theoretically required to support said bed in a fluidized state.

3. The method of claim 1 wherein said hydrateable inorganic salt is composed of a major proportion of particles from 5 to 50 microns in size.

4. The method of claim 1 wherein said hydrateable inorganic salt is sodium tripolyphosphate.

5. A method of making a composition composed of particles comprising a chlorocyanurate and partially hydrated sodium tripolyphosphate, said chlorocyanurate being preferentially internally concentrated in said particles, said method comprising the steps of (a) forming a fluidized bed of particulate hydrateable sodium tripolyphosphate composed of a major proportion of particles from 5 microns to 200 microns in size and (b) introducing droplets of an aqueous slurry of said chlorocyanurate into said fluidized bed said droplets having a mean diameter from 10 to 30 times larger than the mean particle size of said sodium tripolyphosphate, the amount of water introduced into the fluidized bed being less than stoichiometrically required for hydration of said sodium tripolyphosphate to the highest hydrate thereof.

6. A method of making a composition composed of particles comprising an enzyme and partially hydrated sodium tripolyphosphate, said enzyme being preferentially internally concentrated in said particles, said method comprising the steps of (a) forming a fluidized bed of particulate hydrateable sodium tripolyphosphate composed of a major proportion of particles from 5 microns to 200 microns in size and (b) introducing droplets of an aqueous slurry of said enzyme into said fluidized bed, said droplets having a mean diameter from 10 to 30 times larger than the mean particle size of said sodium tripolyphosphate, the amount of water introduced into the fluidized bed being less than stoichiometrically required for hydration of said sodium tripolyphosphate to the highest hydrate thereof.

References Cited
UNITED STATES PATENTS

| | | | |
|---|---|---|---|
| 3,112,274 | 11/1963 | Morgenthaler et al. | 252—99 |
| 3,154,494 | 10/1964 | Speak et al. | 252—99 X |
| 3,248,330 | 4/1966 | Feierstein et al. | 252—99 |
| 3,265,629 | 8/1966 | Jensen | 252—316 |
| 3,354,090 | 11/1967 | Keast | 252—99 |
| 3,415,758 | 12/1968 | Powell et al. | 252—316 |

RICHARD D. LOVERING, Primary Examiner

U.S. Cl. X.R.

117—100 A, DIG 6; 252—90, 95, 103, 135, 156, 316, DIG 12